United States Patent Office 3,424,756
Patented Jan. 28, 1969

3,424,756
PROCESS FOR THE PREPARATION OF METHINE COMPOUNDS CONTAINING A PYRIDINIUM OR QUINOLINIUM GROUP
John G. Fisher, David J. Wallace, and James M. Straley, Kingsport, Tenn., assignors to Eastman Kodak Company, Rochester, N.Y., a corporation of New Jersey
No Drawing. Continuation-in-part of application Ser. No. 306,990, Sept. 6, 1963, now Patent No. 3,247,215. This application Mar. 30, 1966, Ser. No. 538,610
U.S. Cl. 260—294.9     7 Claims
Int. Cl. C09b 23/04; C07d 31/46

ABSTRACT OF THE DISCLOSURE

Process for the preparation of quaternary methine compounds which are useful as dyes for acrylic fibers, yarns, and fabrics which comprises heating a haloalkylamino-aromatic aldehyde with a pyridine or quinoline compound and simultaneously or subsequently forming the methine compound by heating the aldehyde with an active methylene compound.

---

This application is a continuation-in-part of our U.S. patent application Ser. No. 306,990 filed Sept, 6, 1963, now U.S. Patent No. 3,247,215.

This invention relates to a process for the preparation of methine compounds particularly useful as dyes for acrylic polymer textile fibers, yarns and fabrics.

The methine compounds IV are prepared by reaction of haloaldehyde compound I with a pyridine or quinoline compound II and reactive methylene compounds Y—CH$_2$—CN as follows:

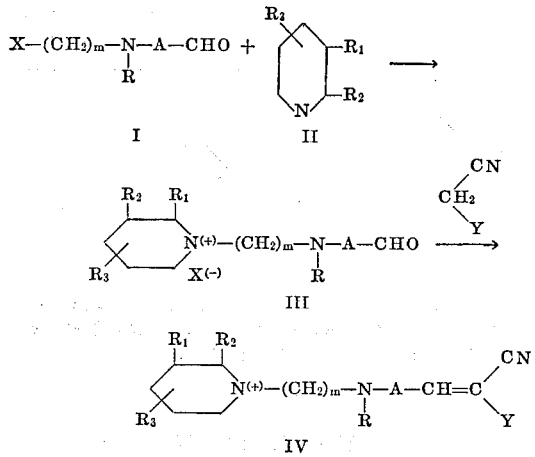

In the first embodiment of the invention the quaternary aldehyde III is first formed, then condensed with the reactive methylene compound Y—CH$_2$—CN. Alternatively, in a second embodiment of the invention, the compound Y—CH$_2$—CN can be added to the initial reaction mixture containing compounds I and II for the formation of compound IV. If desirable, the quaternary aldehyde can be isolated before reaction with the compound Y—CH$_2$—CN but good yields are obtained by adding the latter compound to the reaction mixture containing the quaternary aldehyde III.

In the above formulas, X represents a halogen atom, e.g. chlorine, bromine or iodine, m is 2 or 3, R represents a lower alkyl radical including alkyl and substituted alkyl such as hydroxyalkyl, e.g. hydroxyethyl; polyhydroxyalkyl, e.g. glyceryl [—CH$_2$CHOHCH$_2$OH]; alkoxyalkyl, e.g. methoxyethyl; cyanoalkyl, e.g. cyanoethyl; cyanoalkoxyalkyl, e.g. β-cyanoethoxyethyl; acyloxyalkyl, e.g. acetoxyethyl; carboalkoxyalkyl, e.g. carbethoxyethyl; halogenoalkyl, e.g. chloroethyl; hydroxyhalogenoalkyl, e.g. β-hydroxy-γ-chloropropyl; alkylsulfonylalkyl, e.g. methylsulfonylethyl; alky-OCOOCH$_2$CH$_2$—, e.g.

CH$_3$OCOOCH$_2$CH$_2$— carboxyamidoalkyl, e.g. carboxamidoethyl; benzyl, phenoxyalkyl, e.g. β-phenoxyethyl; cyanoalkyl, e.g. β-cyanoethyl; alkylsulfonamidoalkyl, e.g. methylsulfonamidoethyl; alkylcarbonamidoalkyl, e.g. ethylcarbonamidoethyl; dicarboxamidoalkyl, e.g. β-dicarboxamidoethyl, etc.; or R represents a monocyclic carbocyclic aromatic radical of the benzene series including unsubstituted and substituted phenyl such as alkylphenyl, e.g. o,m,p-tolyl; alkoxyphenyl, e.g. o,m,p-methoxyphenyl; halophenyl, e.g. o,m,p-chlorophenyl; nitrophenyl, e.g. o,m,p-nitrophenyl; alkylsulfonylphenyl, e.g. o,m,p-methylsulfonylphenyl; alkylsulfonamidophenyl, e.g. o,m,p-methylsulfonamidophenyl; di(alkylsulfonyl)phenyl, e.g. 2,5-di(methylsulfonyl)phenyl; dicarboxylicacidimidophenyl, e.g. o,m-succinimidophenyl; fluoroalkylphenyl, e.g. trifluoromethylphenyl; acylamidophenyl, e.g. o,m,p-acetamidophenyl; cyanophenyl, e.g. o,m,p-cyanophenyl; carboxamidophenyl, e.g. o,m,p-carboxamidophenyl; benzamidophenyl; thiocyanophenyl, e.g. o,m,p-thiocyanophenyl; alkylthiophenyl, e.g. o,m,p- methylthiophenyl; benzoxyphenyl, e.g. o,m,p-benzoxyphenyl; benzaminophenyl, e.g. o,m,p-benzaminophenyl; benzylaminophenyl, e.g. o,m,p-benzylaminophenyl; N-alkylbenzaminophenyl, e.g. N-phenylmethylaminophenyl; formylphenyl, e.g. o,m,p-formylphenyl; carbalkoxyphenyl, e.g. o,m,p-carbethoxyphenyl; benzoylphenyl, e.g. o,m,p-benzoylphenyl; etc.; or R in conjunction with A provide the atoms necessary to form a saturated ring of, for example, the tetrahydroquinoline or benzomorpholine series.

A represents a monocyclic carbocyclic aromatic radical of the benzene series including unsubstituted phenylene, e.g. p-phenylene, and substituted phenylene, e.g. such as alkylphenylene, e.g. o,m-tolylene; alkoxyphenylene, e.g. o,m-methoxyphenylene; halophenylene, e.g. o,m-chlorophenylene; alkylsulfonylphenylene e.g. o,m-methylsulfonylphenylene; alkylsulfonamidophenylene, e.g. o,m-methylsulfonamidophenylene; di(alkylsulfonyl)phenylene, e.g. 2,5-di(methylsulfonyl)phenylene; dicarboxylicacidimidophenylene, e.g. o,m-succinimidophenylene; acylamidophenylene, e.g. o,m,-acetamidophenylene; benzamidophenylene, thiocyanophenylene, e.g. o,m-thiocyanophenylene; alkylthiophenylene, e.g. o,m-methylthiophenylene; benzoxyphenylene, e.g. o,m-benzoxyphenylene, benzaminophenylene, e.g. o,m-benzaminophenylene; benzylaminophenylene, e.g. o,m-benzylaminophenylene; N-alkylbenzaminophenylene, e.g. o,m,N-phenylmethylaminophenylene; carbalkoxyphenylene, e.g. o,m-carbethoxyphenylene; benzoylphenylene, e.g. o,m-benzoylphenylene, etc.; also, as mentioned, A in conjunction with R forms a saturated ring.

R$_1$ represents H, lower alkyl or together with R$_2$ forms a radical of the quinoline series.

R$_2$ represents H, lower alkyl, alkoxy; or R$_2$ together with R$_1$ forms a quinoline radical; or R$_2$ together with R$_3$ (when the latter is in the 4-position in the pyridine ring) forms a radical of the isoquinoline series.

R$_3$ represents H, alkyl or in conjunction with R$_2$ as described above.

Y represents either CN, a lower COOalkyl radical, CONH$_2$ or a lower CON(alkyl)$_2$ radical.

The substituents of the above radicals, e.g. of radical A are not especially critical and serve primarily as auxochrome groups to vary the color or shade, and sometimes the substantivity, of the methine compound.

The embodiments of the process of our invention, therefore, have in common the step of reacting a quaternary aldehyde of formula

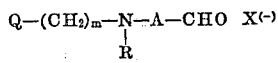

with the compound Y—CH$_2$—CN for production of quaternary methine compounds of the formula

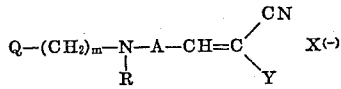

wherein Q represents N-pyridinium, lower alkyl substituted N-pyridinium, N-quinolinium or lower alkyl substituted N-quinolinium radical, m is 2 or 3, and R, A and Y are radicals as described above.

The process of the mentioned first embodiment of the invention can be carried out by heating the aldehyde I in a solution containing excess pyridine or quinoline compound II within a wide range of time and temperature, e.g. for about 10 to 70 hours at about 80° to 150° C. depending somewhat on the particular reactants in use, and preferably without isolating the quaternary aldehyde III, then usually cooling and adding the compound Y—CH$_2$—CN and if desired, a condensing agent such as piperidine and heating until the methine compound IV has formed, for example heating at reflux or at a temperature of about 100° C. or higher for about two hours as described in Examples 2 and 7 to 13 below. The effect of time, temperature and concentrations on yield is illustrated in the following reaction carried out under the conditions and with the results shown in the table.

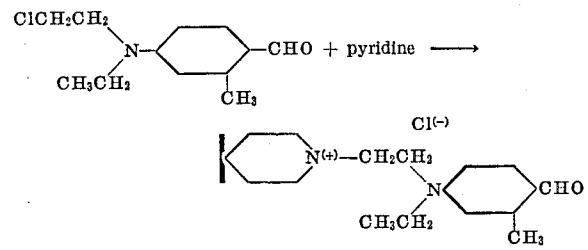

| Run No. | Moles Aldehyde | Ml. Pyridine | Temp., ° C. | Time, hr. | Yield, percent |
|---|---|---|---|---|---|
| 1 | .02 | 10 | 95 | 22 | 29 |
| 2 | .02 | 10 | 115 | 22 | 87 |
| 3 | .02 | 10 | 115 | 45 | 94 |
| 4 | .02 | 15 | 115 | 45 | 97.7 |
| 5 | .02 | 20 | 115 | 22 | 92.5 |
| 6 | .02 | 20 | 115 | 45 | 99 |

In the mentioned second embodiment of the invention the aldehyde I and the reactive methylene compound Y—CH$_2$—CN are heated in a solution of excess pyridine or quinoline compound II preferably containing a condensation agent such as piperidine, until the desired quaternary methine compound IV is obtained. Good yields are obtainable by heating within a wide range of time and temperature, e.g. from about 90–150° C. for about 7–40 hours as shown in Examples 1, 3, 4 and 5 below.

In the mentioned processes, it may be advantageous to employ an auxiliary solvent in addition to the pyridine or quinoline compound, in which the quaternary methine compound is insoluble, e.g. hydrocarbon solvents such as benzene, toluene, etc.

The processes can be expected to be more economical and produce product of higher quality than obtainable in similar processes for the production of quaternary methine dye compounds, for example, as compared to processes where quaternization is carried out on preformed methine compounds.

The processes of our invention are illustrated by the following examples.

EXAMPLE 1

Aldehyde preparation 200 ml. of phosphorous oxychloride was added over a four hour period to a solution of 179 g. f N,β-hydroxyethyl-N-ethyl-m-toluidine in 90 ml. of dimethylformamide at a temperature of 25–90° C. After heating the reaction mixture on the steam bath for two hours it was drowned in 6 liters of water and ice. The resulting solid was filtered off and washed with 8 liters of water. The yield of p-(N,β-chloroethyl-N-ethylamino) - 2 - methylbenzaldehyde was 179 g. It had a melting point of 46 to 47° C.

Methine dye preparation

A solution of 4 - (N,β - chloroethyl - N-ethylamino)-2-methylbenzaldehyde (2.26 g.) malononitrile (0.66 g.) and piperidine (1 drop) in pyridine (10 ml.) was heated at 115° C. for 7½ hours. After overnight standing at room temperature, the dye crystallized from the solution. It was collected on a funnel and air dried to yield 2.1 g. of product or 60% of theory. This dye imparts yellow shades to acrylic fibers and has the formula

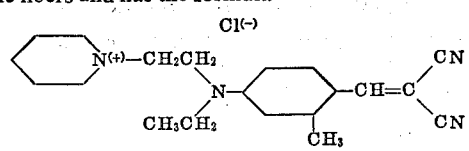

The other aldehydes of Formula I above are prepared in the manner of this example.

EXAMPLE 2

A solution of 4 - (N,β-chloroethyl-N-ethylamino)-2-methylbenzaldehyde (4.5 g.) in pyridine (20 ml.) was heated at 115° C. for 45 hours. After cooling to 85° C. malononitrile (1.32 g.) and piperidine (2 drops) were added. The solution was heated back to 115° C. and held for two hours. The pyridine was removed by distillation in a vacuum keeping the pot temperature at 95–100° C. The residue was dissolved in water (200 ml.), a small amount of charcoal added and the solution filtered. The dye was precipitated by addition of a solution of ZnCl$_2$ (1.4 g.) and NaCl (10 g.) in water (40 ml.) with good stirring. The dye was collected and air dried to give 9.2 g. of

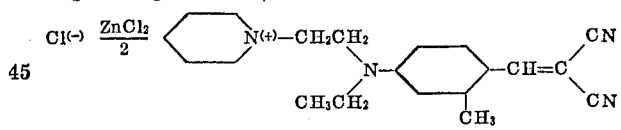

EXAMPLE 3

The dye was prepared by the method of Example 1 except that the heating period was 20½ hours. The yield of dye in this case was 79.5% of theory.

EXAMPLE 4

A solution of 4 - (N,β-chloroethyl-N-ethylamino) - 2-methylbenzaldehyde (4.5 g.), malononitrile (1.32 g.) and piperidine (2 drops) in β-picoline (10 ml.) was heated at 140° C. for 20½ hours. After allowing to cool the solution was drowned in dilute hydrochloric acid and the following dye precipitated by addition of NaCl and ZnCl$_2$.

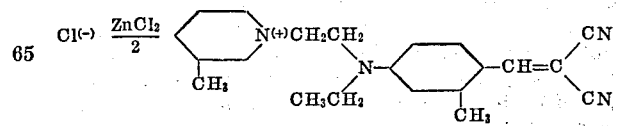

EXAMPLE 5

A solution of 4-(N,β-chloroethyl-N-phenylamino)-2-methoxybenzaldehyde (1.35 g.), malononitrile (0.33 g.) and piperidine (1 drop) in pyridine (10 ml.) was heated at 115° C. for 20 hours. On cooling a sticky solid separated. This was isolated, taken up in hot water, charcoal added and the solution filtered. The following dye was precipitated by addition of NaI.

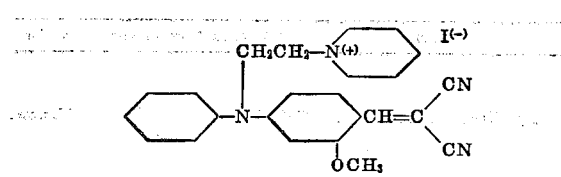

EXAMPLE 6

A solution of 4 - (N,β-chloroethyl-N-ethylamino) - 2-methylbenzaldehyde (4.5 g.), malononitrile (1.32 g.) and piperidine (2 drops) in commercial mixed picolines (20 ml.) was heated at 95° C. for 40 hours. The solution was drowned in water, charcoal added and then filtered. The dye below was precipitated by addition of NaCl and ZnCl₂.

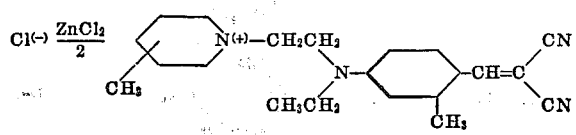

EXAMPLE 7

A solution of 4-(N,β-bromoethyl-N-ethylamino)benzaldehyde (1.41 g.) in pyridine (5 ml.) was heated at 115° C. for 35 hours. After cooling to 80° C. malononitrile (0.33 g.) and piperidine (1 drop) were added. The solution was heated at 115° C. for one hour and allowed to cool. Careful addition of a small amount of benzene with good stirring induces crystallization of the following dye.

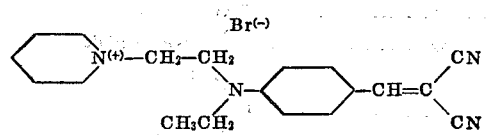

EXAMPLE 8

A solution of N,β-chloroethyl 2,7-dimethyl-6-formyl-1,2,3,4-tetrahydroquinoline (2.52 g.) in pyridine (15 ml.) was heated at 115° C. for 50 hours, cooled slightly and malononitrile (0.61 g.) and piperidine (2 drops) added. After one hour's heating at 115° C., the solution was allowed to cool to room temperature and then stirred and cooled in an ice bath. The crystallized dye below was collected, washed with benzene and dried at room temperature.

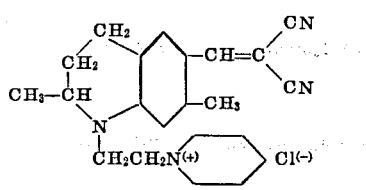

EXAMPLE 9

A solution of N,β-chloroethyl-2,7-dimethyl-6-formyl-benzomorpholine (1.27 g.) in pyridine (10 ml.) was heated at 115° C. for 46 hours. After cooling to 70° C., malononitrile (0.33 g.) and piperdine (1 drop) were added. The solution was heated for one hour at 115° C. and the dye crystallized upon cooling. It was collected and washed with pyridine (3 ml.) to yield 1.7 g. of

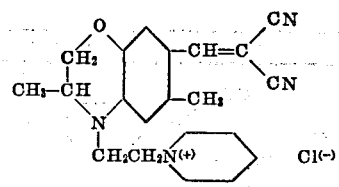

EXAMPLE 10

A solution of 4-(N,β-chloroethyl-N-ethylamino)-2-methylbenzaldehyde (4.5 g.) in quinoline (25 ml.) was heated at 115° C. for 24 hours. After allowing to cool a little, malononitrile (1.32 g.) and piperidine (2 drops) were added. The solution was heated one hour longer at 115° C. and then drowned in dilute hydrochloric acid. Charcoal was added and the solution filtered. Addition of an aqueous solution of NaCl and ZnCl₂ precipitated the dye. The yield was 7.5 g. of

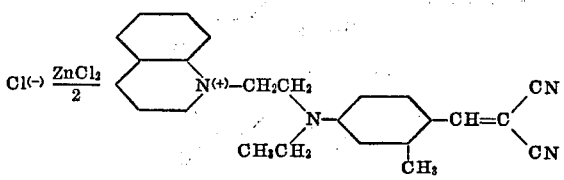

EXAMPLE 11

If the active methylene compound in Example 10 is replaced by ethylcyanoacteate (2.26 g.), then 9.4 g. of the following dye is obtained.

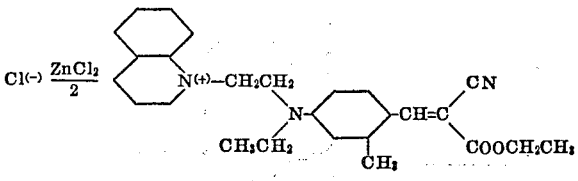

EXAMPLE 12

A solution of 4-(N,β-chloroethyl-N,β-cyanoethyl amino)-2-methylbenzaldehyde (2.5 g.) in pyridine (15 ml.) was heated at 115° C. for 65 hours. It was allowed to cool to 85° C. and malononitrile (0.66 g.) and piperidine (1 drop) were added. The solution was heated for one hour at 115° C. and allowed to cool. The crystallized dye was collected and washed with pyridine (5 ml.). A yield of 2.55 g. of the following dye was obtained.

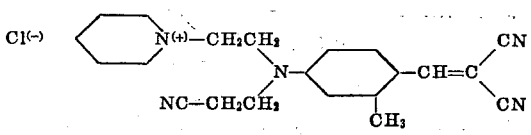

EXAMPLE 13

If the aldehyde of Example 12 is replaced by 4-(-N,β-chloroethyl-N,β-cyanoethyl amino)benzaldehyde (2.36 g.) then 3.05 g. of the following is obtained.

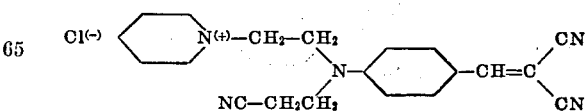

Other quaternary methine compounds of Formula IV above are prepared in the manner of the above examples by heating the alhehydes and reactive methylene compounds in an excess of the solvent shown in the following table, heating being carried out for about 10 to 70 hours at about 80–150° C. The color given is that obtainable on dyeing acrylonitrile polymer fibers.

TABLE

| Example | Aldehyde | Solvent | Methylene Component | Color |
|---|---|---|---|---|
| 14 | 4-[N(CH₂CH₂Cl)(CH₂CH₂CN)]-C₆H₄-CHO | Pyridine | CH₂(CN)₂ | Yellow. |
| 15 | 4-[N(CH₂CH₂Cl)(CH₂CH₃)]-2-OCH₃-C₆H₃-CHO | do | CH₂(CN)₂ | Do. |
| 16 | 4-[N(CH₂CH₂Cl)(CH₂CH₃)]-2-Cl-C₆H₃-CHO | do | CH₂(CN)₂ | Do. |
| 17 | 4-[N(CH₂CH₂Cl)(CH₂CH₃)]-3-CH₃-C₆H₃-CHO | do | CH₃-CH(CN)(CO₂CH₃) | Do. |
| 18 | 4-[N(CH₂CH₂Cl)(CH₂CH₃)]-3-CH₃-C₆H₃-CHO | do | CH₃-CH(CN)(CO₂CH(CH₃)₂) | Do. |
| 19 | 4-[N(CH₂CH₂Cl)(CH₂CH₃)]-3-CH₃-C₆H₃-CHO | do | CH₃-CH(CN)(CONH₂) | Do. |
| 20 | 4-[N(CH₂CH₂Cl)(CH₂CH₃)]-3-CH₃-C₆H₃-CHO | do | CH₃-CH(CN)(CONHCH₃) | Do. |
| 21 | 4-[N(CH₂CH₂Cl)(CH₂CH₃)]-3-CH₃-C₆H₃-CHO | do | CH₃-CH(CN)(CONHCH₂CH₃) | Do. |
| 22 | 4-[N(CH₂CH₂Cl)(CH₂CH₃)]-3-CH₃-C₆H₃-CHO | do | CH₃-CH(CN)(CON(CH₃)₂) | Do. |
| 23 | 4-[N(CH₂CH₂Cl)(CH₂CH₃)]-3-CH₃-C₆H₃-CHO | 3-methylquinoline | CH₂(CN)₂ | Do. |
| 24 | 4-[N(CH₂CH₂Cl)(CH₂CH₃)]-3-CH₃-C₆H₃-CHO | 2-methyl-5-ethylpyridine | CH₂(CN)₂ | Do. |
| 25 | 4-[N(CH₂CH₂Cl)(CH₂CH₃)]-3-CH₃-C₆H₃-CHO | 3-methoxypridine | CH₂(CN)₂ | Do. |
| 26 | 4-[N(CH₂CH₂Cl)(CH₂CH₃)]-3-CH₃-C₆H₃-CHO | 5-methylquinoline | CH₂(CN)₂ | Do. |
| 27 | 4-[N(CH₂CH₂Cl)(CH₂CH₃)]-3-CH₃-C₆H₃-CHO | 2,7-dimethylquinoline | CH₂(CN)₂ | Do. |
| 28 | 2-OCH₃-4-OCH₃-5-[N(CH₂CH₂Cl)(C₆H₄-OCH₃)]-C₆H₂-CHO | Pyridine | CH₃-CH(CN)(CO₂CH₃) | Do. |

TABLE—Continued

| | Aldehyde | Solvent | Methylene Component | Color |
|---|---|---|---|---|
| 29 | ClCH₂CH₂, CH₂—C(=O)–N–CH₂CH₂, CH₂—C(=O)–N–⟨cyclohexyl⟩–CHO, CH₃ | do | CH₂(CN)₂ | Do. |
| 30 | CH₃–CH, CH₂, CH₂, N–⟨ring⟩–CHO, CH₃, CH₂CH₂Cl | do | CH₂(CN)₂ | Do. |
| 31 | ClCH₂–CH(Cl)–CH₂, CH₃CH₂, N–⟨ring⟩–CHO, CH₃ | do | CH₂(CN)₂ | Do. |
| 32 | ClCH₂CH₂, CH₃C(=O)OCH₂CH₂, N–⟨ring⟩–CHO, CH₃ | do | CH₂(CN)₂ | Do. |
| 33 | ClCH₂CH₃, CH₃CH₂, N–⟨ring, OCH₃, OCH₃⟩–CHO | do | CH₂(CN)₂ | Do. |
| 34 | ClCH₂CH₂, ⟨phthalimide-like⟩NCH₂CH₂, N–⟨ring⟩–CHO, CH₃ | do | CH₂(CN)₂ | Do. |
| 35 | ClCH₂CH₂, F₂CHCH₂, N–⟨ring⟩–CHO | do | CH₂(CN)₂ | Do. |

The new methine compounds of our invention are valuable dyestuffs for various synthetic textile materials. The quaternary methine compounds dye polyacrylonitrile and modified polyacrylonitrile textile materials fast, bright yellow shades. The quaternary methine compounds have good affinity for the aforesaid textile materials and yield bright yellow dyeings thereon which have good fastness to light, gas, sublimation and wet processing. Wet processing includes, for example, washing, perspiration, wet ironing and wet sublimation.

The following example illustrates one way in which the methine compounds of the invention can be used to dye acrylonitrile polymer textile material. .1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc with warm water. 5 cc of a 5% aqueous solution of formic acid or acetic acid are added and then 10 grams of fabric made from an acrylic fiber is carentered and in case of Orlon 42 the dying is carried out at the boil for one hour. In the case of materials made of Verel acrylic fiber the dyebath temperature should not exceed 90° C. in order to avoid damage to the fiber. The dyed material is then washed well with water and dried. Suitable acrylonitrile polymers are disclosed in U.S. Patents 2,970,783, 2,879,253, 2,879,254, 2,838,470 and 2,831,826.

The invention has been described in considerable detail with particular reference to certain peferred embodiments thereof, but it will be understood that variations and modifications can be effected within the spirit and scope of the invention as described hereinabove, and as defined in the appended claims.

We claim:
1. A process for preparing a quaternary methine compound of the formula

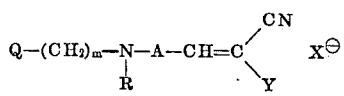

which comprises heating a compound of the formula

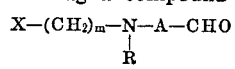

in the presence of pyridine, lower alkylpyridine, quinoline, or lower alkylquinoline and a compound of the formula

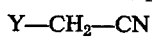

wherein
Q is N-pyridinium, lower alkyl-N-pyridinium, quinolinium, or lower alkyl-N-quinolinium;
$m$ is 2 or 3;
R is a lower alkyl group or a phenyl group;
A is a p-phenylene group;

when taken collectively, is a 1,2,3,4-tetrahydroquinoline group or a benzomorpholine group;

X is Cl, Br or I; and

Y is —CN, lower —COOalkyl, —CONH$_2$ or lower —CON(alkyl)$_2$.

2. A process according to claim 1 wherein the heating is at a temperature of about 80° to 150° C. and wherein Q is N-pyridinium or lower alkyl-N-pyridinium;

m is 2 or 3;

R is lower alkyl or phenyl;

A is p-phenylene or p-phenylene substituted with methyl, methoxy, or chloro;

X is Cl, and

Y is —CN.

3. A process for preparing a quaternary methine compound of the formula

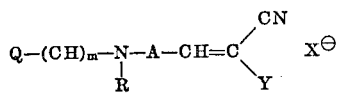

which comprises heating an aldehyde of the formula

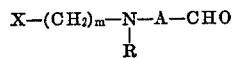

in the presence of pyridine, lower alkylpyridine, quinoline, or lower alkylquinoline to yield an intermediate compound of the formula

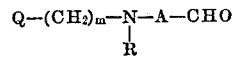

and heating the intermediate compound with a compound of the formula Y—CH$_2$—CN, wherein Q is N-pyridinium, lower alkyl-N-pyridinium, quinolinium, or lower alkyl-N-quinolinium;

m is 2 or 3;

R is a lower alkyl group or a phenyl group;

A is a p-phenylene group;

when taken collectively, is a 1,2,3,4-tetrahydroquinoline group or a benzomorpholine group;

X is Cl, Br, or I; and

Y is —CN, lower —COOalkyl, —CONH$_2$ or lower —CON(alkyl)$_2$.

4. A process according to claim 3 wherein said heating is at a temperature of about 80° to 150° C.

5. A process according to claim 4 wherein Q is N-pyridinium or lower alkyl substituted N-pyridinium and Y is —CN.

6. A process according to claim 3 which comprises heating an aldehyde of the formula

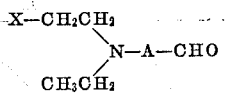

in the presence of pyridine or picoline at a temperature of about 80° to 150° C. to yield an intermediate compound of the formula

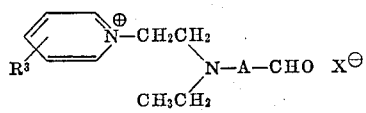

and, without isolating the intermediate compound, heating the intermediate compound with malononitrile at a temperature of about 100° C., wherein X is Cl or Br;

R$^3$ is hydrogen or methyl; and

A is p-phenylene or p-phenylene substituted, with respect to the nitrogen atom to which A is attached, at the 3-position with methyl, methoxy, or chloro.

7. A process according to claim 6 wherein the aldehyde is heated in the presence of pyridine at a temperature of about 115° C. to yield an intermediate compound of the formula

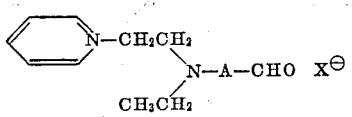

and heating the intermediate compound with malononitrile at a temperature of about 100° C. in the presence of piperidine.

References Cited

UNITED STATES PATENTS

| | | | |
|---|---|---|---|
| 3,141,018 | 7/1964 | Straley et al. | 260—247.2 |
| 3,157,660 | 11/1964 | Stilz et al. | 260—283 |
| 3,194,805 | 7/1965 | Brooker et al. | 260—283 X |
| 3,247,211 | 4/1966 | Weaver et al. | 260—287 |
| 3,247,215 | 4/1966 | Fisher et al. | 260—294.9 |

ALEX MAZEL, *Primary Examiner.*

D. G. DAUS, *Assistant Examiner.*

U.S. Cl. X.R.

8—55; 260—244, 270, 283, 286, 289, 293, 465.1, 465.4, 567.6, 577